(No Model.)

S. PORTER.
SUSPENSION DEVICE FOR INCANDESCENT LAMPS.

No. 486,604. Patented Nov. 22, 1892.

WITNESSES.
INVENTOR.

UNITED STATES PATENT OFFICE.

STEPHEN PORTER, OF BOSTON, MASSACHUSETTS.

SUSPENSION DEVICE FOR INCANDESCENT LAMPS.

SPECIFICATION forming part of Letters Patent No. 486,604, dated November 22, 1892.

Application filed November 23, 1891. Serial No. 412,719. (No model.)

*To all whom it may concern:*

Be it known that I, STEPHEN PORTER, of Boston, in the county of Suffolk and State of Massachusetts, have invented certain new and useful Improvements in Suspension Devices for Incandescent Lamps, &c., of which the following is a specification.

This invention has for its object to provide simple and efficient means for taking up any desired portion of a flexible support used to suspend an article from a fixed point overhead, so that said article may be suspended at any desired height, the invention being particularly intended for use in connection with flexible electric conductors which are used to support pendent incandescent lamps.

The invention consists, as a whole, in a spool or reel adapted to be engaged with the flexible support, so that when rotated in one direction it will accumulate portions of the support upon its periphery and when rotated in the opposite direction will give out portions of the flexible support from its periphery; means for automatically rotating said spool to cause it to wind up or accumulate the flexible support, and a frictional brake or retarding device which is separable from the flexible support and is adapted to act on the same in such manner as that the weight of the article suspended will prevent the rotation of the spool when the article is allowed to hang in its natural position and act by gravitation on the support, the arrangement being such that a movement or change of position of the retarding device will separate it from the support, and thus remove the friction therefrom and allow the spool to take up or give out any desired portion of the same, thus adjusting the article suspended by the support.

The invention also consists in certain details and incidental improvements, all of which I will now proceed to describe and claim.

Figure 4:
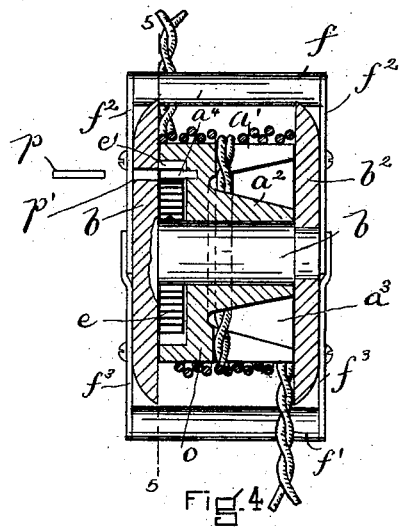
Figure 5:
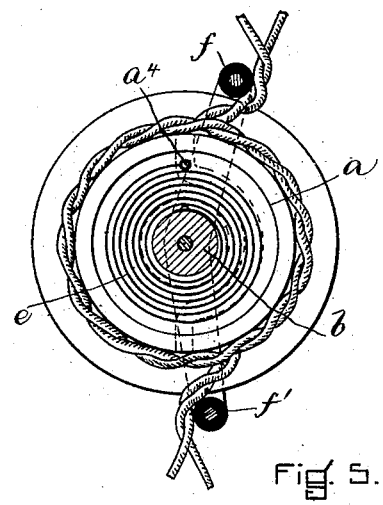
Figure 2:
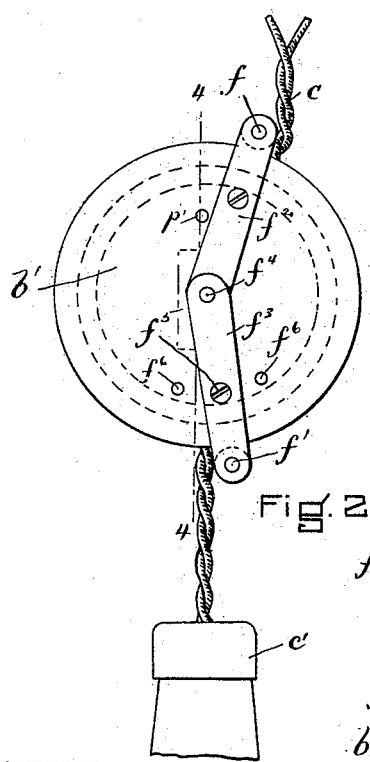
Figure 3:
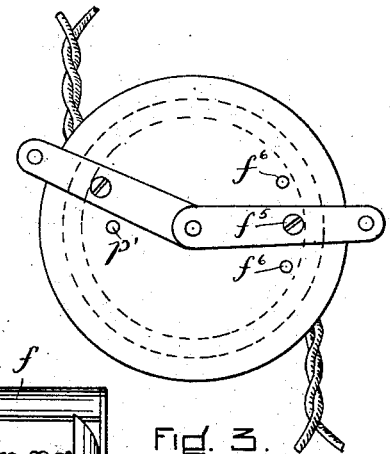
Figure 1:
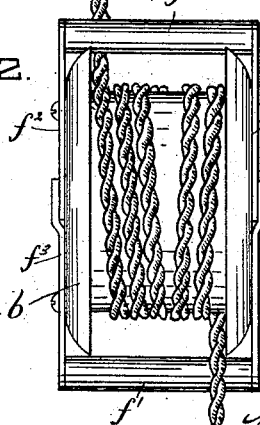

Of the drawings forming part of this specification, Figure 1 represents a front elevation of my improved suspension device. Fig. 2 represents a side elevation of the same, the brake or retarding device being shown in position to prevent the rotation of the spool. Fig. 3 represents a side elevation, the retarding device being moved to permit the spool to rotate and take up the flexible support. Fig. 4 represents a section on line 4 4, Fig. 2, looking toward the right. Fig. 5 represents a section on line 5 5, Fig. 4, looking toward the right.

The same letters of reference indicate the same parts in all the figures.

In the drawings, $a$ represents a spool, which is mounted to rotate upon a stud $b$, affixed to a head $b'$, the spool being adapted to rotate independently of the head and stud. The spool is retained upon the stud by means of a head $b^2$, affixed to the stud at the opposite end of the spool from the head $b'$.

$c$ represents a flexible support, which in this case may be considered a flexible conductor, composed of two wires twisted to form a cord, such as is used to suspend an incandescent lamp. For the sake of convenience I will hereinafter refer to the flexible support as the "cord." The cord is engaged with the spool $a$ by being passed through slots $a'$ $a'$ in the spool, said slots being formed in a flange constituting a portion of the periphery of the spool and separated from the inner portion or hub $a^2$ of the spool by an annular space $a^3$. The cord is passed through the slots $a'$ $a'$ and passes around one side of the hub through a portion of the annular space $a^3$, the cord being thus given an extended bearing upon the spool, which prevents it from slipping freely in the spool. The portions of the cord extending from the periphery of the spool are wound upon said periphery in any desired number of convolutions, the convolutions of the end that extends downwardly and is attached to the article suspended (in this case the socket $c'$ of an incandescent lamp) being wound in the opposite direction from the convolutions of the portion of the cord that extends upwardly from the spool and is attached to a fixed elevated support. Means are provided for automatically rotating the spool $a$ in such direction as to cause it to wind upon its periphery portions of the cord, and thus virtually shorten the cord and raise the lamp suspended thereby. I prefer to employ as the means for automatically rotating the spool $a$ volute helical spring $e$, contained in a recess in one end of the spool and attached at its inner end to the stud $b$ and at its outer end to a pin or stud $a^4$ affixed to the spool. I do not limit myself to this device, however, but may employ any suitable mechanical equivalent thereof, such as a weight.

$f f'$ represent two bars attached at their ends to arms $f^2 f^3$, which are affixed to the heads $b' b^2$. Said bars extend across the space between the heads and are in close proximity to the peripheries of the heads. The portion of the cord that extends upwardly from the spool to the fixed support above passes around one side of the bar $f$, and the portion of the cord that extends downwardly to the lamp-socket passes around the opposite side of the bar $f'$, as shown in Figs. 1, 2, and 5. The bars $f f'$ are preferably arranged at about diametrically-opposite points with reference to the spool, although I prefer to locate both arms slightly at one side of the vertical center, as indicated in Figs. 2, 3, and 5. The bars $f f'$, arranged as described, in close proximity to the periphery of the spool, prevent the cord from taking the direct course away from the periphery of the spool, which it would if said bars were not present, and cause the cord to hug the periphery of the spool and be deflected, so that it will be abruptly bent into bights at the point where it bears on said bars. The spring $e$ or its specified equivalent having a tendency to take in the cord or wind it upon the periphery of the spool, counteracts the force exerted by the weight of the lamp and socket, so that the lamp will not unwind the cord by its weight. The bars $f f'$, arranged, as shown, to deflect the cord, cause the weight of the lamp and socket supported by the cord to so press the cord against the bars as to prevent the force of the spring or its equivalent from rotating the spool and taking in or shortening the cord. It will be seen, therefore, that when the cord and lamp are allowed to hang in a normal position there will be no action of the spool, and the result will be the same as if the spool were not present—that is to say, the lamp will hang at the point at which it was previously adjusted and will neither move up nor down. When it is desired to vary the length of the cord and raise or lower the lamp, the operator taking hold of the suspending device moves it to the position shown in Fig. 3, thus separating the bars $f f'$ from the portions of the cord upon which they bore, either allowing the spring to rotate the spool and take up the cord, or allowing the spool to rotate backward in response to a downward pull exerted on the cord by the operator's hand, the result being in either case a variation in the height of the lamp, which variation or adjustment is retained by the return of the device to its normal position upon the removal of the operator's hand. It will be seen that the bars $f f'$ have no positive engagement with the cord, each bar bearing against one side of the cord, and being adapted to be entirely separated therefrom by a lateral movement, thus leaving the cord entirely free to extend directly from the periphery of the spool to the elevated support and to the lamp-support. I do not limit myself to the employment of this device in connection with incandescent electric lamps, and it may be adapted to support chandeliers or any other articles which are or may be suspended by flexible cords or supports.

The parts of the frame holding the spool may be readily separated to permit the engagement of the spool with the cord, it being only necessary to remove the head $b^2$ from the spool, thus exposing the annular opening $a^3$ and enabling the cord to be moved laterally into the slots $a' a'$, said slots extending to the end of the spool in which the annular opening $a^3$ is formed. It will be seen, therefore, that the device can be engaged with a cord without removing the lamp from the cord and by simply moving the cord laterally into engagement with the spool. The spool may be prevented from rotating when the head $b^2$ is removed and there is no cord present by means of a pin $p$, inserted in an orifice $p'$ in the head $b'$, the inner end of said pin engaging an eye $e'$, formed on the outer end of the spring, said eye being the same that the pin $a^4$ on the spool is engaged with. By thus securing the spring it is prevented from losing its force when the cord is being removed and inserted, and also it is enabled to be put under a greater state of tension by rotating the spool while the outer end of the spring is held by the pin.

I prefer to make the bar $f'$ adjustable laterally to vary the extent of the displacement of the cord by said bar. To this end the arms $f^3$, supporting the bar $f'$, are pivoted at $f^4$ to the center of the device, so that the bar may be swung laterally. The bar may be held in different positions by means of a stud or screw $f^5$, inserted in the arm $f^3$ and adapted to engage one of a series of orifices $f^6$, formed in the head $b'$. The bars $f f'$, serving to deflect the cord and hold it in two abruptly-bent bights or loops, constitute an automatic friction device or brake held by the gravitation of the article suspended in position to prevent the taking-up action of the spring and displaced by the operator to permit the taking-up action of the spring. I do not limit myself to the described construction and arrangement of the friction device, but may organize the same in any other suitable way, so that it will perform the function above described. The bars $f f'$ are preferably provided with coverings of yielding insulating material, such as vulcanized rubber, the object of which is, first, to prevent abrasion or wear of the insulating material on the electric conductors composing the cord, and, secondly, to prevent the current from flowing from said cord through the frame of the device in case said conductors become bare. If desired, the bar $f$ may be made laterally adjustable in the same manner that the bar $f'$ is made adjustable, as above described.

I am aware that it has been proposed to mount a spring-rotated spool in a frame, the ends of which are at opposite sides of the spool, said ends having eyes through which a flexible cord passes, the cord being wound upon the spool. In the only instance of such proposed use of which I am aware, however, the spool is normally prevented from rotating and exerting a pull upon the cord by means of gravitating dogs or ratchets similar to those used in the well-known Hartshorn curtain-fixture, the arrangement being such that when it is desired to raise the article suspended by the cord the cord is manipulated like a curtain suspended by a Hartshorn fixture—that is to say, the cord is pulled downwardly and then allowed to move upwardly at a comparatively-rapid rate—thus preventing the action of the dogs until the desired height is reached, when an arrest of the upward movement gives time for the dogs to engage the spool and prevent the further action of the spring. It is obvious that such a device is much more complicated than mine and operates upon a different principle. In my device the bars or bearings $f\ f'$ at opposite sides of the spool are in close proximity to the periphery of the spool, so that when said bars are in their normal position they hold the cord in abrupt bends or bights, and thus cause the weight of the suspended article to hold the cord against the bars with sufficient force to prevent the taking-up action of the spring. The spring, however, at all times exerts a pull on the cord, (which is not the case with the device having the gravitating dogs,) so that whenever the bars $f\ f'$ are displaced from their normal position, as shown in Fig. 3, the bights of the cord are instantly let out and the spring is permitted to act.

I claim—

1. A suspension device comprising a spool adapted to be engaged with a cord and provided with a spring exerting a constant pull on the cord in the direction required to wind the same upon the spool, and a support for the spool provided with bars or bearings for the cord located at opposite sides of the periphery of the spool and in close proximity thereto, said bearings being rigidly connected with each other, arranged to bear upon and form abrupt bends or bights in the cord and prevent the taking-up action of the constantly-pulling spring when the support is in its normal position and to let out said bights and permit the taking-up action of the spring when the support is moved from its normal position, the action of the spring being opposed only by the friction of the cord on said bearings, so that when the bearings are displaced the spring is free to act, as set forth.

2. In a suspension device, the combination of the spool having cord-receiving slots open at one end of the spool, a stud on which said spool is adapted to rotate, heads on said stud at opposite ends of the spool, one of said heads being removable to expose the slotted end of the spool, and the cord-deflecting bars on the heads, as set forth.

3. In a suspension device, the combination of the spool, the stud supporting the spool, the heads on the stud, the laterally-adjustable bars or friction devices secured to said heads, and means for holding said bars in the different positions to which they may be adjusted, as set forth.

In testimony whereof I have signed my name to this specification, in the presence of two subscribing witnesses, this 19th day of November, A. D. 1891.

STEPHEN PORTER.

Witnesses:
C. F. BROWN,
A. D. HARRISON.